United States Patent [19]
Kojima et al.

[11] Patent Number: 5,101,848
[45] Date of Patent: Apr. 7, 1992

[54] SHUT OFF APPARATUS FOR A FLUID PASSAGE, METHOD FOR CONTROLLING THE SAME, AND METHOD FOR CONFIRMING CLOSING OF THE SAME

[75] Inventors: Yoshio Kojima; Tsutomu Okusawa, both of Hitachi; Kuniyoshi Tsubouchi; Yoichi Yoshinaga, both of Mito; Yusuke Takagi; Kenji Mitani, both of Yokohama; Nobuo Hamano, Tokyo, all of Japan

[73] Assignee: Hitachi, Ltd., Tokyo, Japan

[21] Appl. No.: 667,664

[22] Filed: Mar. 11, 1991

[30] Foreign Application Priority Data

Mar. 9, 1990 [JP] Japan .................................. 62-56373

[51] Int. Cl.⁵ ............................................... F17D 1/16
[52] U.S. Cl. ........................................ 137/13; 137/828
[58] Field of Search ................................ 137/13, 828

[56] References Cited
U.S. PATENT DOCUMENTS 4,203,472  5/1980  Dulaney ............................ 137/828
4,989,626  2/1991  Takagi ................................. 137/13

Primary Examiner—Alan Cohan
Attorney, Agent, or Firm—Antonelli, Terry, Stout & Kraus

[57] ABSTRACT

Method of opening and closing a fluid passage comprises the steps of freezing fluid in the fluid passage by first cooling the fluid to a temperature below the freezing point of the fluid to close the fluid passage and after the fluid passage is closed, raising the temperature of the fluid close (or just below) to the freezing point of the fluid, whereby the fluid passage is maintained in a closed state with a small power supply and the responsiveness in opening the fluid passage is enhanced.

11 Claims, 11 Drawing Sheets

FIG. 13b

SHUT OFF APPARATUS FOR A FLUID PASSAGE, METHOD FOR CONTROLLING THE SAME, AND METHOD FOR CONFIRMING CLOSING OF THE SAME

BACKGROUND OF THE INVENTION

The present invention relates to an improvement in a shut off apparatus for a fluid passage and a method of opening and closing the apparatus. The present invention particularly relates to a shut off apparatus in which a fluid passage is opened or closed by thawing or freezing fluid flowing through the fluid passage.

Shut off apparatus for various separating and analyzing instruments which deal with organism specimens, such as cells and proteins, are required to have the following functions: firstly, the apparatus has little irregularity in passage walls thereof, and organism specimens adhered to the passage walls can be cleaned with ease; secondly, little damage is provided to an organism specimen used in opening or closing the apparatus; and lastly, it is possible to simultaneously open or close a plurality of passages since those instruments can perform such an operation.

A typical example of such an apparatus is disclosed in Japanese Patent Unexamined Publication No. 60-199564, for example, in which a passage is closed or opened by freezing or melting the fluid flowing therethrough.

This apparatus, however, has a problem in which it is not possible to confirm that the fluid in the apparatus has actually frozen and the passage is closed upon cooling the apparatus to close the passage. This problem results for the following reason. When the fluid is rapidly cooled it does not effect the closing function of the passage at a freezing point thereof in a transient stage and it primarily effects the closing function only when the adhering force of the frozen portion of the fluid to a passage wall becomes larger than the force due to the flow of the fluid.

For this reason, the fluid must be rapidly cooled below the freezing point thereof to close the passage and the cooling means should be always supplied with electric power also after the passage is closed. Therefore, the temperature of the apparatus or that of the fluid further drops after the passage is closed, and the fluid is cooled to a low temperature considerably below the freezing point of the fluid.

The cooling means is thus provided with electric power more than that necessary for the freezing of the fluid in order to maintain the closing function of the fluid after the passage is closed. Moreover, because it is necessary to raise the temperature of the apparatus, which has been cooled too low, to above the freezing point in opening the passage by thawing the fluid by heating, it takes a lot of time to thaw the fluid, so that the apparatus is deteriorated in its ability to respond quickly and efficiently in thawing of the fluid.

Accordingly, it is an object of the present invention to provide a shut off apparatus for a fluid passage and method of controlling the apparatus which enables low consumption of electric power for maintaining the closing state thereof after the passage is closed.

Another object of the present invention is to provide a shut off apparatus for a fluid passage and method of controlling the apparatus which is enhanced in responsiveness in thawing of the fluid.

Still another object of the present invention is to provide a method of confirming the closing of the shut off apparatus.

SUMMARY OF THE INVENTION

The method of the invention for opening or closing a fluid passage by melting or freezing the fluid flowing through the passage, respectively, is characterized in that the fluid is frozen by being cooled below the freezing point thereof to thereby close the passage, and after being frozen, the fluid is raised in temperature close to the freezing point thereof.

According to the method of the invention, the temperature of the fluid which can maintain a passage closing function is very close to the freezing point of the fluid as compared to the temperature at which the fluid closes the passage. That is, after the fluid within the shut off apparatus is frozen and effects the passage closing function, it is possible to maintain the closing of the passage even if the temperature of the fluid is raised close to the freezing point. Accordingly, the power supply to the cooling means can be reduced.

When opening the shut off apparatus, that is to say, heating the shut off apparatus by means of a heating means to thaw the fluid which is in a frozen condition, it is only necessary to heat the shut off apparatus from a temperature very close to the freezing point of the fluid to that above the freezing point temperature thereof, so that it is possible to enhance the responsiveness of the apparatus in thawing.

BRIEF DESCRIPTION OF THE DRAWINGS

FIG. 3b is a side view of the embodiment shown in FIG. 3a;

FIG. 13b is a side view of the shut off apparatus of FIG. 13a.

DETAILED DESCRIPTION OF THE PREFERRED EMBODIMENTS

The present invention will be described with reference to the drawings, in which corresponding parts are designated by the same reference numerals and descriptions thereof are omitted after once given.

Figure 1:
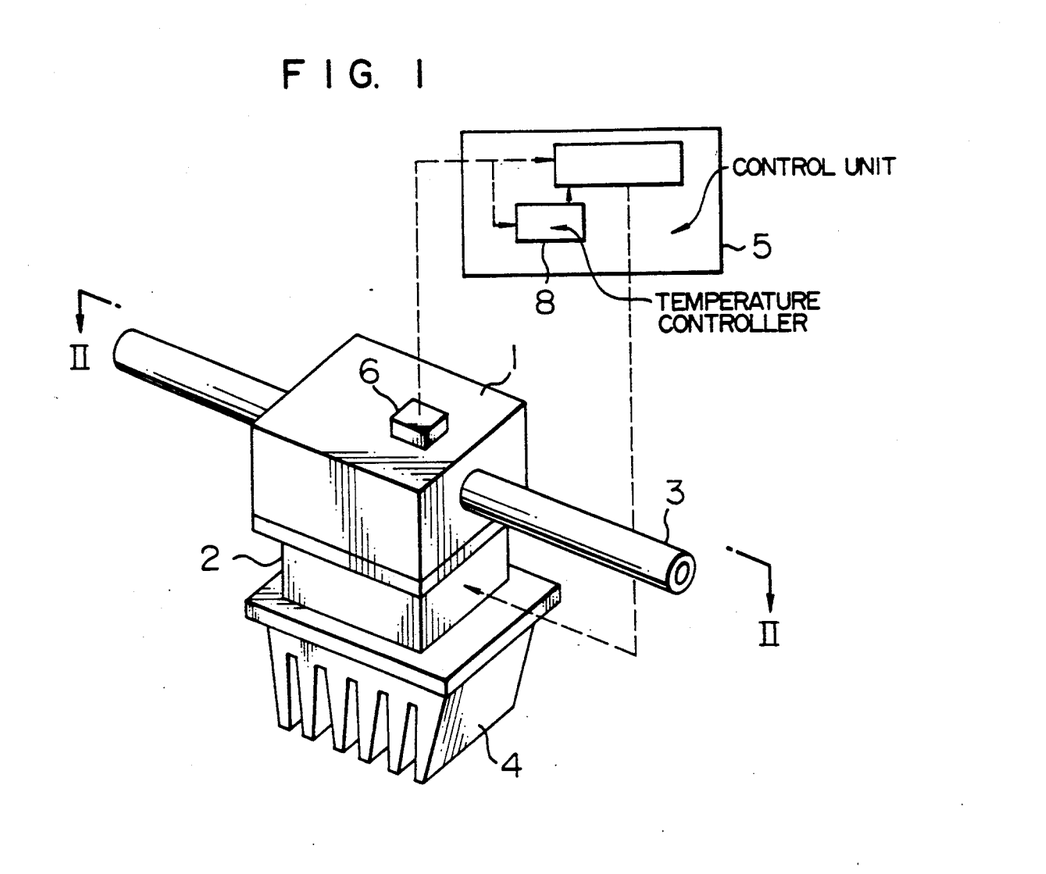
FIG. 1 is a perspective view of a shut off apparatus according to the present invention.
Figure 2:
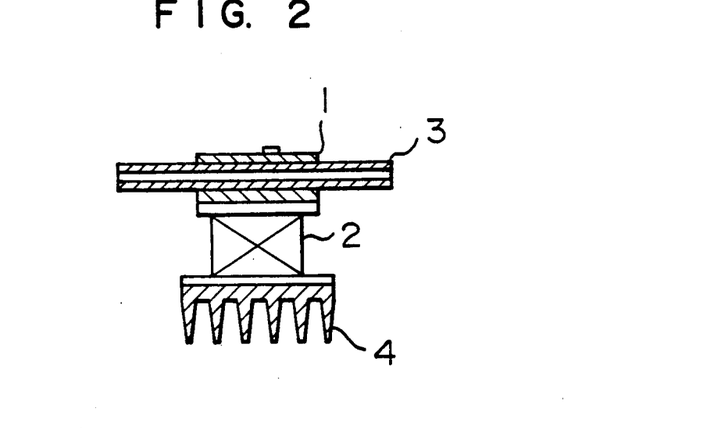
FIG. 2 is a cross-sectional view taken along the line II—II in FIG. 1.

FIGS. 1 and 2 illustrate a shut off apparatus, that is, a shut off valve which utilizes a phase change of fluid. The passage of the valve is opened or closed by melting or freezing the fluid in the passage. The reference numeral 3 designates a conduit defining the passage, around which a shut off valve 1 is arranged for opening and closing the passage. A reference numeral 2 designates a cooling and heating device. A thermoelectric element which is capable of electrically cooling or heating an object is used here as the cooling and heating device. The thermoelectric element utilizes the Peltier effect which causes endothermic reaction at one surface of the junction of the different semiconductors and exothermic reaction at the other surface when direct current is applied. By changing the polarity of the current applied to the element, the direction of exothermic and endothermic can be reversed, and hence it is possible to cool or heat an object. The thermoelectric element is jointed at one end thereof (upper end in FIG. 2) to the shut off valve 1 which is made of a substance of good thermal conductivity. The conduit 3 passes through the valve 1. The cooling and heating device 2 is jointed at the other end to radiating fins 4 for preventing excessive heating of the cooling and heating device 2. The cooling and heating device 2 is controlled by a control unit 5 and the temperature of the valve 1 is detected by a temperature sensor 6.

When closing the valve 1, the control unit 5 controls the cooling and heating device 2 to cool the valve 1. Due to the cooling, the fluid in the valve freezes, so that the fluid functions as a valve to close the passage. When opening the valve 1, the fluid in the valve 1 is molten by heating the valve 1, that is the fluid functions, in effect, as a valve to open the passage.

Figure 3A:
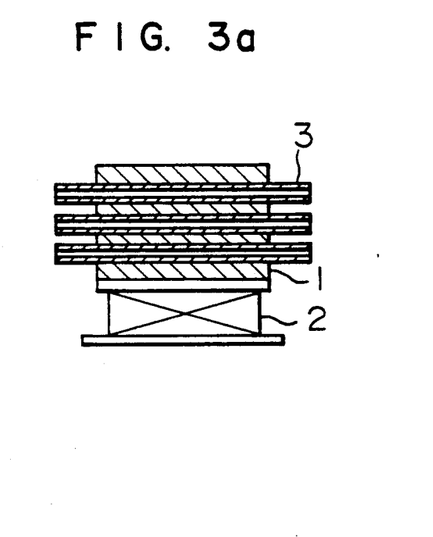
FIG. 3a is a vertical cross-sectional view of another embodiment of the shut off apparatus of the present invention.
Figure 3B:
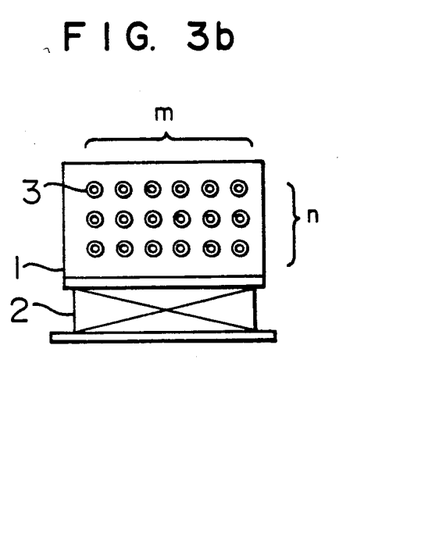

Although in this embodiment only one passage is provided, the valve 1 may have more than one passage. FIGS. 3a and 3b illustrate a shut off valve having a construction in which passages are arranged in m×n (6×3) array. In this modified valve, passages are simultaneously opened and closed by heating and cooling the valve by the cooling and heating device 2.

Method of controlling the opening and closing of the valve 1 will be described.

Figure 4:
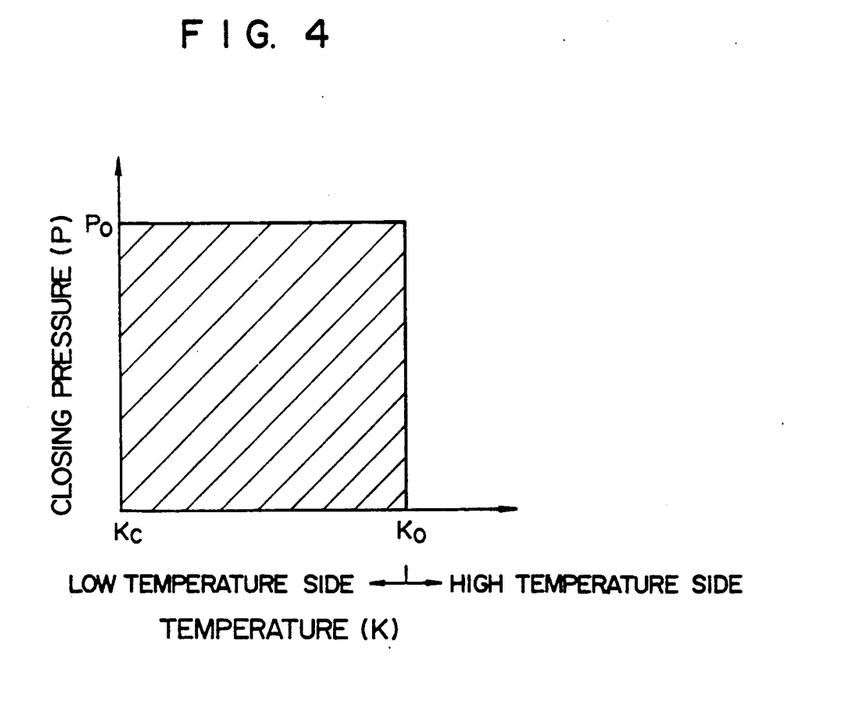
FIG. 4 is a graph showing a relationship between closing pressure and temperature of the fluid in the shut off apparatus of the invention.

FIG. 4 shows a result of an experiment in which after the fluid effects the passage closing function, the fluid is cooled to temperature Kc, which is a sufficiently low temperature lower than the freezing temperature Ko, and then the pressure of the fluid to break the passage closing function of the fluid with respect to the respective temperature of the fluid is measured. An axis of ordinate represents the breaking pressure (P) of the fluid and an axis of abscissa represents the temperature variation. It will be understood from FIG. 4 that once the fluid is frozen, the fluid has a constant breaking pressure Po, in other words, a constant closing pressure Po in a temperature range between the sufficiently low temperature Kc and the freezing temperature Ko. The experiments reveals that the valve 1 has a so-called stepwise characteristic. The inventors have confirmed that, in a shut off valve 1 with an inner diameter 1.0 mm of the passage, the closing pressure of the fluid is several times larger than the closing pressure 2 kg/cm² in an electromagnetic shut off valve with the same passage inner diameter.

From this experiment, in a method of the invention for controlling the shut off apparatus 1, the temperature of the fluid is rapidly raised to and maintained at the freezing temperature Ko or temperature slightly lower than the freezing temperature after the passage is closed by the cooled fluid. The reference numeral 8 in FIG. 1 denotes a temperature controller.

According to this method, the fluid is melted to open the passage by elevating the temperature of the fluid by only a few degrees. The method achieves an advantage of greatly reducing the time duration of melting the frozen fluid. As is in the electromagnetic valve which is widely used as a shut off valve, the common shut off valves always require a constant electric power in order to maintain an open state or a closed state. According to the present invention, however, the fluid is maintained at the freezing point Ko after the fluid is frozen to effect the passage closing function. This means that the shut off valve 1 is maintained at a small power consumption, and hence power consumption of the cooling and heating device 2 is greatly reduced after the closing of the passage.

Figure 5:
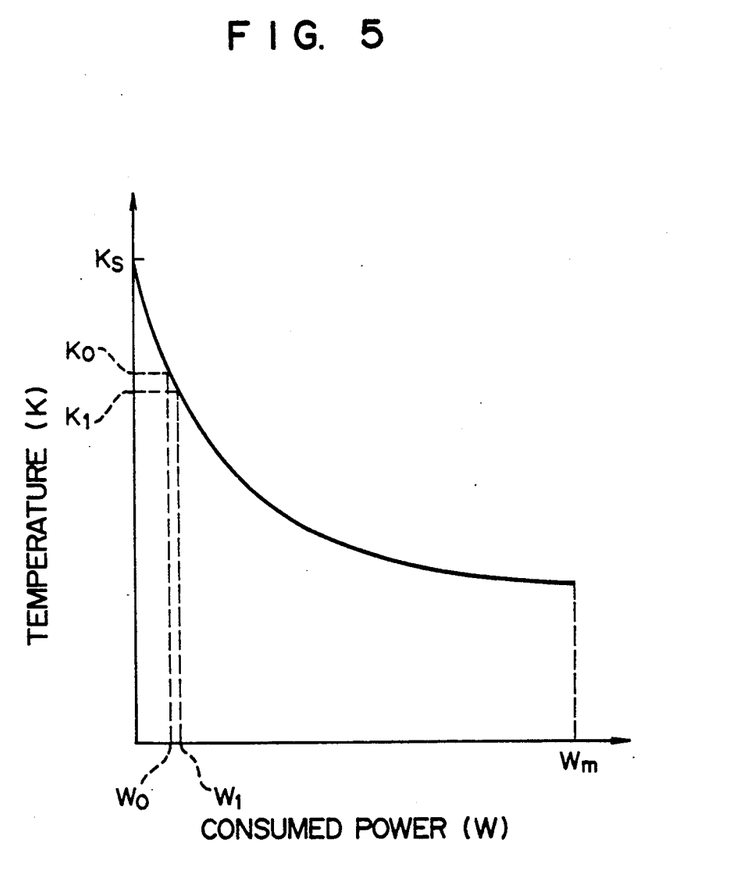
FIG. 5 is a graph showing a relationship between power supplied to the cooling and heating means and reached temperature of the solution.

FIG. 5 shows a relationship between the consumption of power W of the cooling and heating device 2 and temperatures K of the fluid attained by the power consumption. From the graph it will be understood that the temperature K of the fluid exhibits a tendency of dropping with an increase in the power consumption W, that is, an increase of the cooling capacity. The power consumption Wo to keep the fluid at the freezing point Ko was very low as compared to the maximum power consumption Wm. The temperature variation around the freezing point Ko relative to the power consumption is large, and the difference between the power Wo to keep the freezing point Ko and the power to keep the temperature K1 slightly lower than the freezing point Ko was relatively small.

It is thus apparent that the power consumption can be largely decreased without deteriorating the passage closing function by maintaining the fluid at the freezing point Ko or a temperature slightly below the Ko after the passage is closed.

Figure 6:
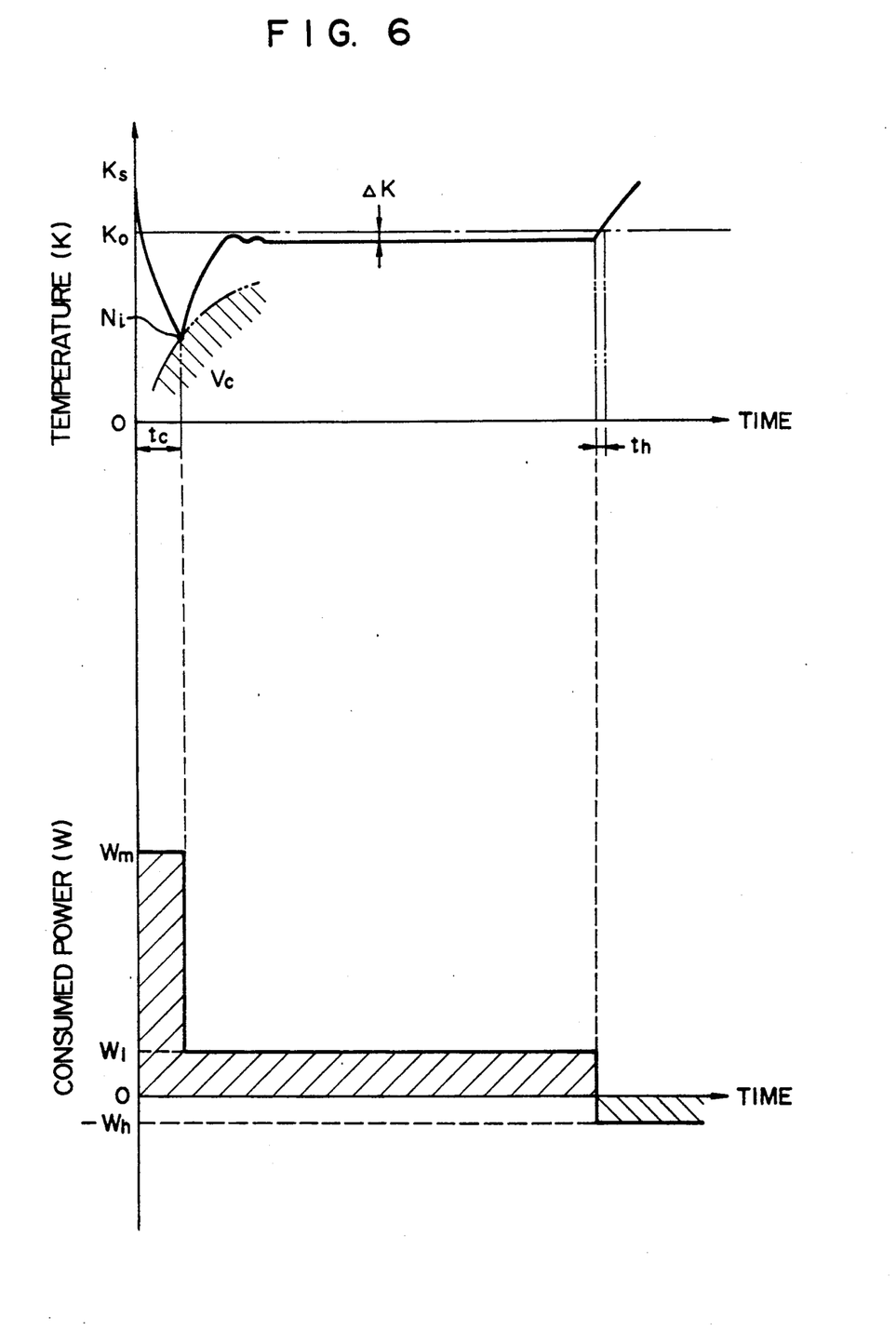
FIG. 6 is graph showing a temperature curve and a power consumption curve illustrating a method of controlling the shut off apparatus of the invention.

FIG. 6 shows a relationship between the power consumption and a passage closing method taking the above-mentioned fact into consideration. An axis of abscissa indicates time t from the start of cooling. An axis of ordinate represents the temperature K of the fluid and the power consumption W of the cooling and heating device. A point Ni or a zone Vc where the passage is closed is determined prior to the passage opening and closing operation. The shut off valve 1 at an initial temperature Ks is cooled to the passage closing zone Vc including the passage closing point Ni by supplying the maximum power consumption Wm to the cooling and heating device 2, so that the valve 1 effects the passage closing function. Then, a necessary minimum power W1 which can maintain the fluid at a temperature which is lower by ΔK than the freezing temperature Ko is rapidly supplied from the control unit 5 to the cooling and heating device 2, and thereby the temperature of the fluid is controlled at the constant temperature (Ko −ΔK). As described, it would be clear that this operation does not deteriorate the passage closing function of the shut off valve 1.

In this embodiment of the method of the invention, the temperature of the fluid is set to the temperature lower by ΔK than the freezing point Ko. The reason why the temperature is set so is a follows. When a constant temperature control is achieved by PID control or the like which is widely used as a temperature control method, overshoot with respect to a set temperature takes place several times until the temperature of the fluid reaches a steady state. By setting the temperature of the fluid below the freezing point Ko thereof, the frozen fluid is prevented from being melted to open the passage.

A power consumption W1 which is necessary to maintain the state is, as shown in FIG. 5, substantially the same as the power Wo to keep at the freezing point Ko, and is small as compared to the maximum power consumption Wm during cooling.

According to this embodiment, the power consumption W1 is very small after the passage closing function is attained, and the total consumption of power is hence greatly reduced. An economical passage control can be achieved, and the longer the time duration to keep the state becomes, the larger the economical advantage becomes.

It is possible to set the keep temperature closely to the freezing point Ko, and hence a few degrees of a temperature rise of the fluid by the cooling and heating device 2 is sufficient for opening the passage by melting the frozen fluid. Thus, the thawing time Th is greatly reduced, and thereby a passage opening method which has an excellent heating responsiveness is provided.

Moreover, this embodiment achieves an advantage that in the heating operation a relatively small amount of electric power, which is supplied to the cooling and heating device 2, provides a sufficient response since only a few degrees of temperature rise achieves opening of the passage.

Another embodiment of the method of the invention will be described with reference to FIG. 7. In the embodiment shown in FIG. 7, the temperature of fluid is regulated to a temperature (Ko $-\Delta K$) after it arrives at the passage closing point Ni by cooling the valve 1 at a time tc, and after the fluid reaches a steady state, the temperature of fluid is further set to a temperature (Ko $-\Delta K'$) which is closer to the freezing point Ko.

According to this method, the temperature of fluid is kept at a temperature closer to the freezing point Ko, and improvement of in the heating responsiveness is achieved as a well as further reduction of the power consumption.

Further, if the above-mentioned operation is repeated and the temperature of the fluid is made to be closer to the freezing temperature Ko gradually while taking care that the temperature of the fluid does not go over the freezing temperature Ko, it is possible to further reduce the power consumption and to further improve the heating responsiveness.

Figure 8:
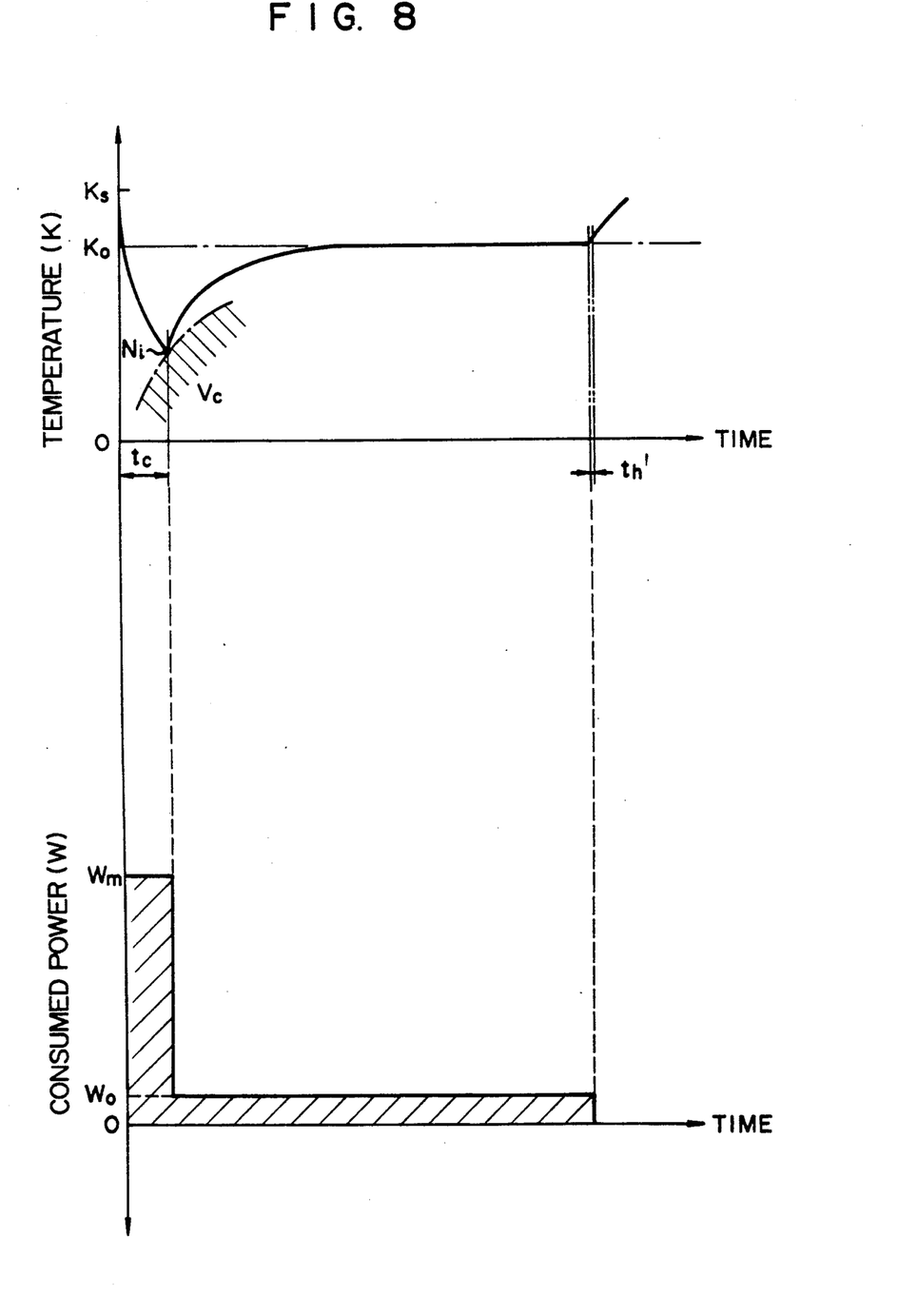

FIG. 8 shows another embodiment of the method of the present invention, in which the temperature of fluid is set to the freezing point Ko after it reaches the passage closing point Ni by cooling the valve 1 at time tc. In this case, it is necessary not to raise the temperature of fluid above the freezing point Ko even instantaneously, and hence care should be taken to set the proportional constant P sufficiently small when the temperature control is achieved by PID control, for example.

According to this embodiment, the temperature of fluid is controlled at a minimum power consumption Wo by setting it once and the passage closing function is maintained by the minimum power consumption Wo. A reduction in power consumption and an improvement in the heating responsiveness are achieved in conjunction with a simple operation.

Figure 7:
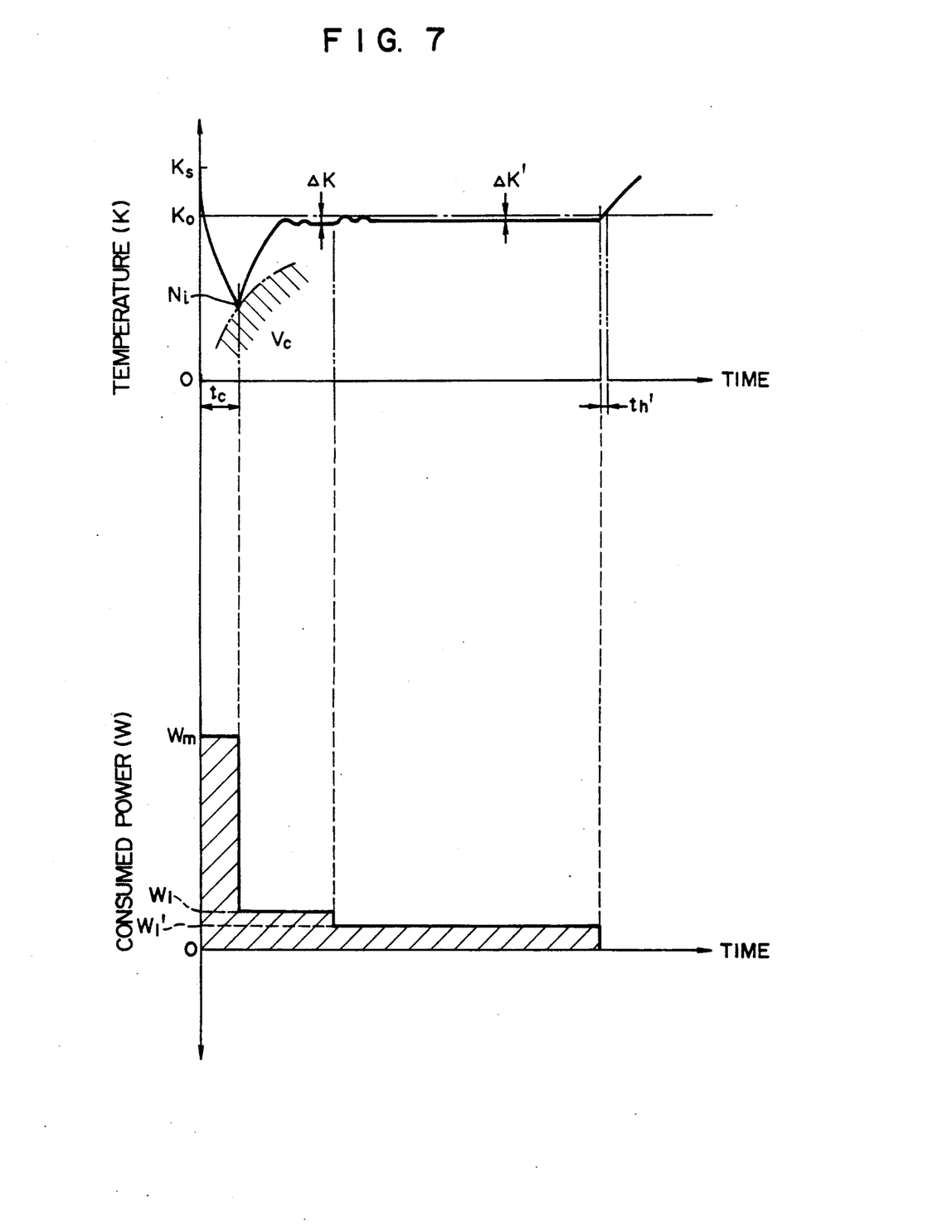
FIGS. 7 to 11 are graphs showing a temperature curve and a power consumption curve illustrating other methods of controlling the shut off apparatus of the present invention.

When the set temperature of the valve is, as shown in FIGS. 7 and 8, equal to the freezing point Ko or a temperature very close to it, if the frozen fluid becomes heated due to an external heat supply even if power supplied to the cooling and heating device 2 is zero, the external heat supply including thermal conduction through the cooling and heating device 2, heat radiation from the atmosphere and heat convection, the fluid may melt.

Figure 9:
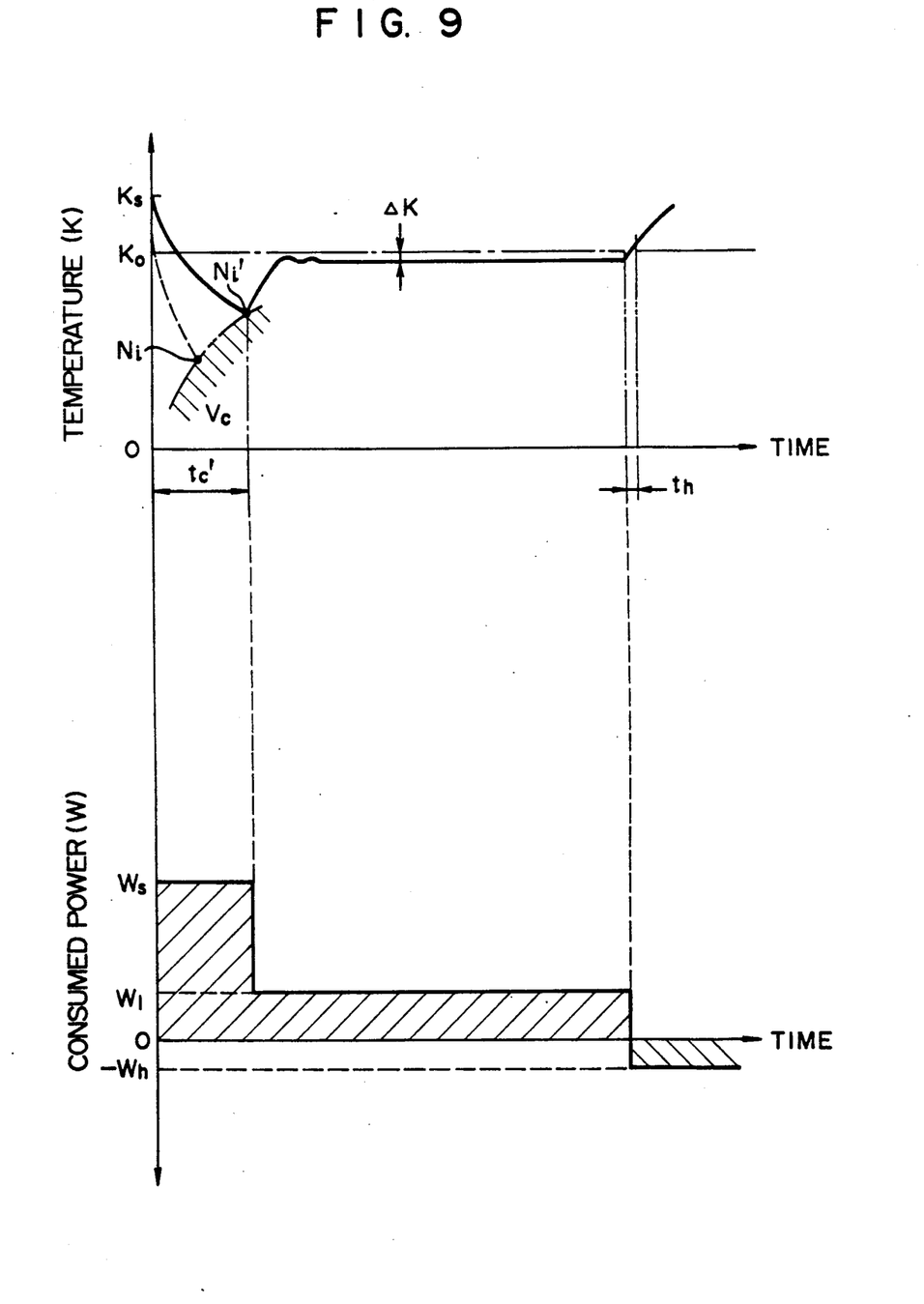

When the temperature of fluid is lowered in the passage closing zone Vc including the passage closing point Ni, for high responsiveness, i.e. effectiveness, the valve 1 may be cooled by the cooling and heating device 2 at the maximum cooling capacity which is attained by maximizing the power supplied to the cooling and heating device 2. In a case where there is a restriction to permissible power, the closing control should be performed not to exceed this restriction. FIG. 9 shows a control method in such a case. In this embodiment, the power during cooling of the valve 1 is set to a restricted power Ws smaller than the maximum power consumption Wm. According to this embodiment, the power consumption at cooling is freely adjustable, and hence the method is applied with ease to a case where a restriction is imposed in consumption of power.

In the preceding embodiments of the method of the present invention, prior to cooling, the initial temperature Ks of the shut off valve 1 is set to a temperature considerably higher than the freezing point Ko, but the valve 1 may be precooled to such a temperature slightly above the freezing point Ko that the fluid does not become frozen.

Figure 10:
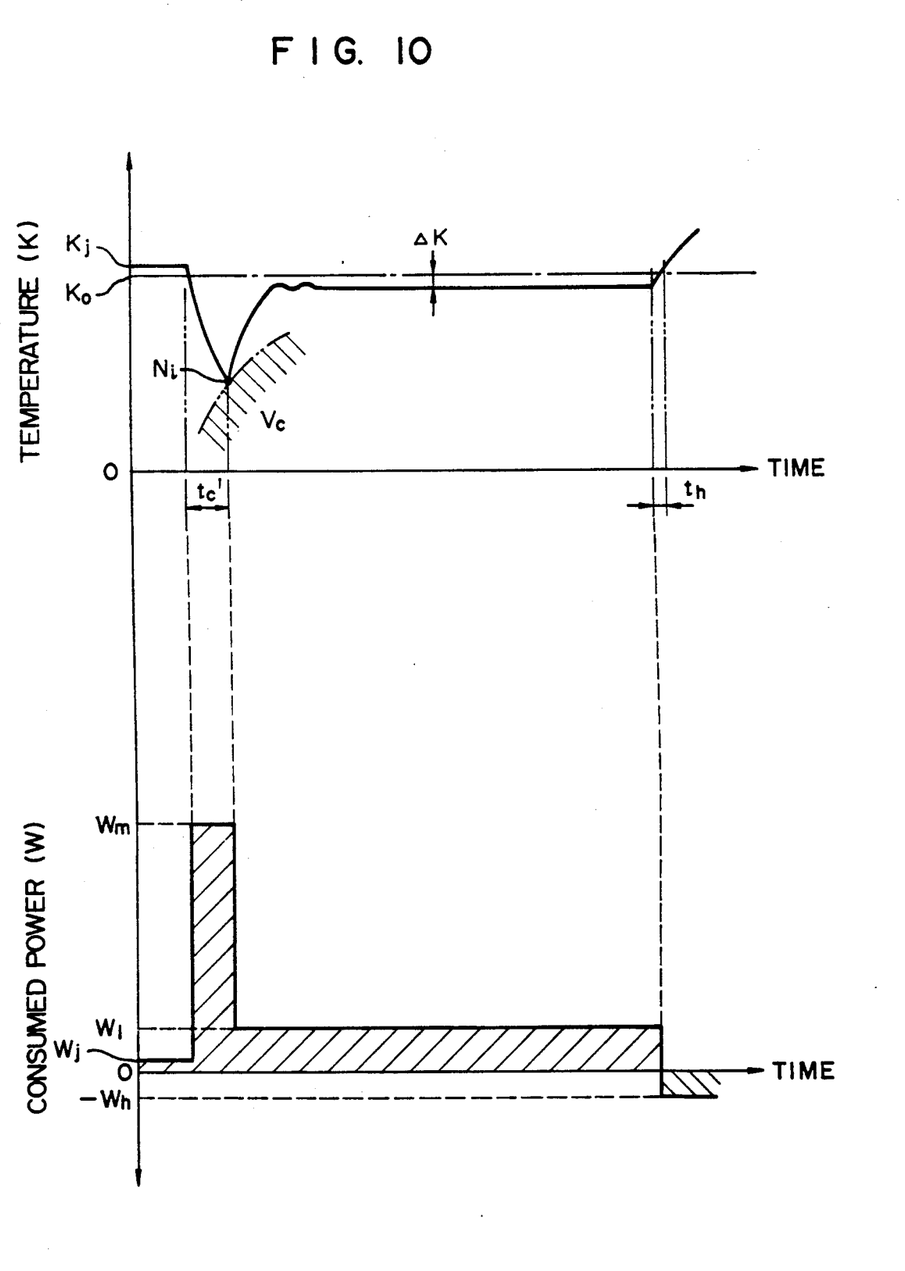

FIG. 10 shows an embodiment of the present invention in which the shut off valve 1 is previously cooled to a temperature Kj slightly higher than the freezing point Ko before the cooling thereof. As shown in FIG. 5, power to precool the valve 1 at the temperature Kj is smaller than the power Wo to keep at the freezing temperature, and the precooling may be carried out just before freezing of the fluid. This embodiment provides an advantage that the time necessary to reach the passage closing point Ni is shortened and responsiveness of the valve 1 in cooling is improved as compared to the preceding embodiments of the present invention.

Figure 11:
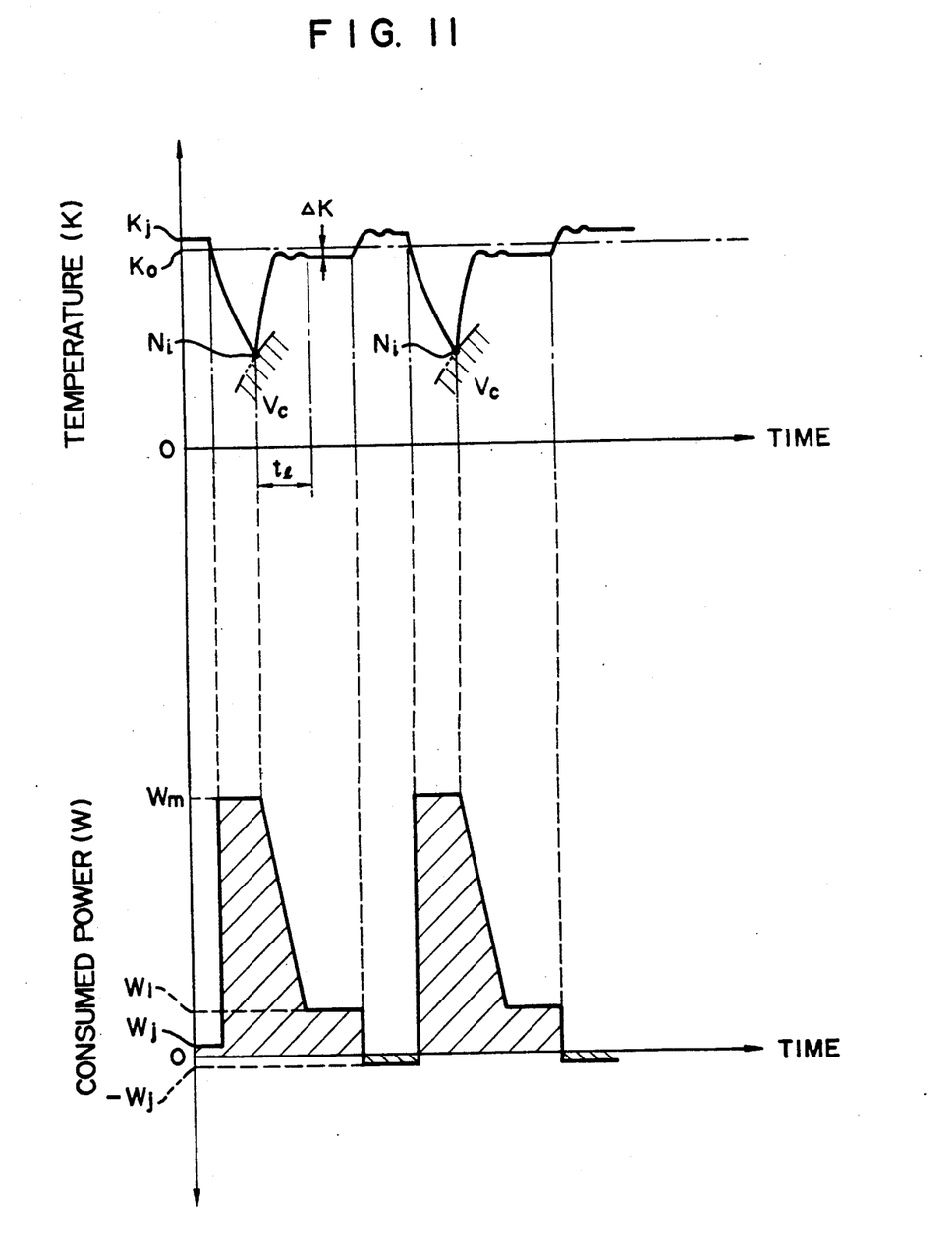

In the preceding embodiments of the present invention, to raise the temperature of fluid close to the freezing point Ko after the closing of the passage, power is stepwisely supplied to the cooling and heating device 2 but the present invention is not limited to this. FIG. 11 shows a valve control method in which after the fluid reaches the passage closing point Ni by cooling at the maximum power consumption Wm, the consumed power is varied with a constant gradient from the maximum power consumption Wm to the power W1 to maintain the fluid at the temperature (Ko $-\Delta K$).

According to this embodiment, the power which is supplied from the passage closing point Ni till the set temperature (Ko $-\Delta K$) is increased and the time duration tl becomes short and therefore the valve 1 can easily cope with a case in which the valve 1 is immediately opened after the passage is closed.

In the foregoing statement, it is described that after the closing of the passage, the fluid is elevated to a temperature close to the freezing point Ko, that is, the fluid is maintained at a freezing temperature. Now, a method to confirm the closing of the passage will be described. Firstly, the response speed of the valve in closing the passage thereof will be described in connection with the confirmation of the closing and opening of the valve, the response speed being one of the basic specification characteristics of the valve. In the shut off valve 1 utilizing a phase change of fluid to which the present invention is applied, the response speed is represented by a time period from the start of cooling the fluid to a time when the closing state of the passage is maintained against a predetermined pressure of the fluid. This time period depends on the cooling capacity of the cooling and heating device 2, that is, the power supplied to the cooling and heating device 2. The closing of the passage becomes quicker as the power increases.

Figure 12:
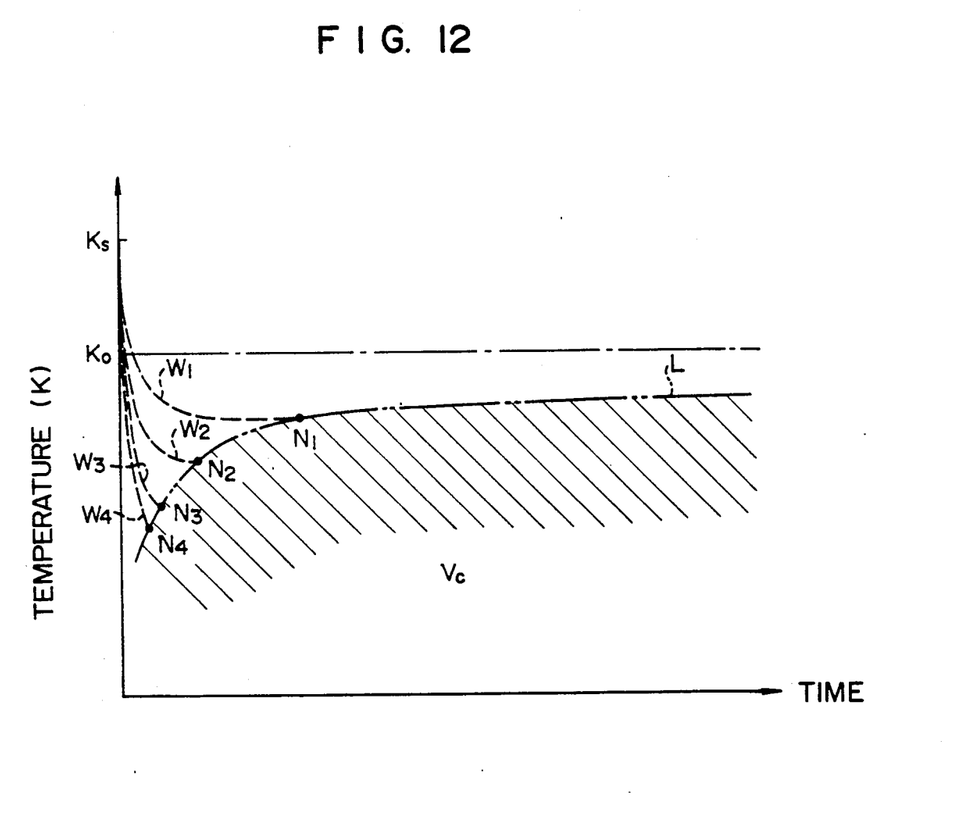
FIG. 12 is a graph illustrating closing states of the passage when the power consumption is varied.

FIG. 12 shows how the passage is closed as the power changes. In FIG. 12, an axis of abscissa indicates time t from the start of the cooling whereas an axis of ordinate indicates temperature K. In this graph, the temperature of the valve 1 is regarded to be equal to the temperature of the fluid for simplification of illustration. The curves W1–W4 shown by broken curves in the FIG. 12 show characteristics in cooling capacity of the cooling and heating device 2, that is, cooling characteristics when the consumed power of the cooling and heating device 2 is changed. In the consumed power, there is a relationship W4>W3>W2>W1. As shown, the temperature of fluid gradually drops from the initial temperature Ks as the power consumption varies, and the valve 1 has a passage closing function at positions N1–N4. With the decrease of the power consumption, the passage closing point N1–N4 varies towards longer cooling time and higher temperature. This is because the cooling capacity is deteriorated due to reduction in consumed power.

Accordingly, to close the passage of the valve 1, it is necessary to cool the fluid by the cooling and heating device 2 into the hatched zone Vc including the passage closing curve L which connects the passage closing points N1–N4.

When the valve is rapidly cooled by the cooling and heating device 2 which has a sufficient cooling capacity for cooling object, in a transient state, the valve 1 cannot close the passage at the freezing point Ko. In other words, the fluid is moving while it is getting frozen.

To confirm that the passage is closed, that is, the fluid is stopped, the passage closing zone Vc is, in the present invention, previously determined (or predetermined). The passage closing zone Vc of the characteristic of the valve 1 is obtained in practice before the actual controlling of the valve 1 is performed.

More specifically, a characteristic as shown in FIG. 4 is previously obtained, and in controlling of the valve 1 the passage closing function is confirmed on the basis of the time it takes from the start of cooling to reach the temperature at the passage closing point Ni, using the previously determined characteristic. In this manner, the passage control is practically performed with ease.

Figure 13A:
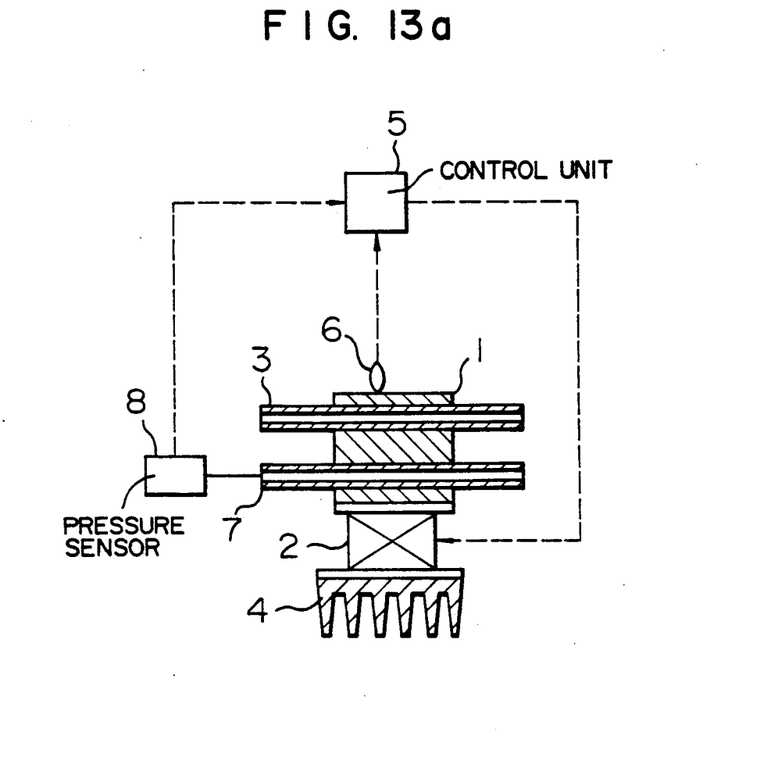
FIG. 13a is a vertical cross-sectional view of another embodiment of the shut off apparatus of the present invention for confirming the passage closing state.
Figure 13B:
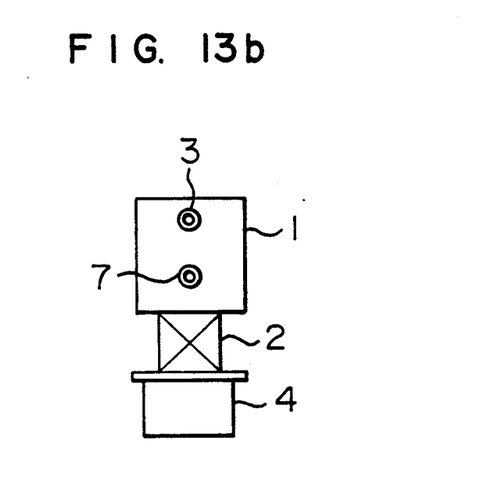

Another confirmation method is illustrated in FIGS. 13a and 13b, in which a shut off valve 1 is provided with a closure confirmation conduit 7 other than the conduit 3. The closure confirmation conduit 7 has a pressure sensor 8 provided at one end thereof, and electric signals from the pressure sensor 8 are fed to the control unit 5. When the valve 1 is cooled, pressure in the closure confirmation conduit 7 rises due to the freezing of the fluid. This passage closing function is confirmed by detecting the rise in pressure by the pressure sensor 8. According to this method, it is not necessary to obtain the passage closing zone Vc every time there is a change in the specification of the valve 1 such as, in the dimension and configuration, as well as that of the cooling and heating device 2, the cooling start temperature, etc., and hence this valve may be adjusted to changes in specification with ease.

It is preferable to use the two passage closure function confirmation methods according to the needs.

According to the valve operation method of the present invention, to close the fluid passage the fluid is frozen by cooling it below the freezing point, and once it is frozen, the temperature of the fluid is raised and maintained close to the freezing point thereof. Thus, the closing state of the valve is maintained at a small supply of energy from the outside, and heating in opening the valve is made to start from a temperature close to the freezing point, so that the valve can be opened in a short time. The present invention is capable of enhancing response speed of the valve significantly.

What is claimed is:

1. In a control method of opening and closing a fluid passage, in which a fluid in the passage is frozen to close the passage and the frozen fluid is thawed to open the passage, the improvement which comprises the steps of:
   in the closing of the passage, freezing the fluid by cooling below the freezing point of the fluid; and
   after closing the passage, immediately elevating the temperature of the fluid to a temperature close to the freezing point thereof.

2. A control method as according to claim 1, wherein the fluid is stepwisely elevated in temperature.

3. In a method of confirming closing of a fluid passage of a closing unit comprising a thermoelectric element for cooling and heating fluid by electric power, means for transmitting heat, joined to said thermoelectric element, and a fluid passage to be cooled and heated provided in said heat transmitting means, in which fluid in the passage is frozen by being cooled to close the passage, and the frozen fluid is thawed by being heated to open the passage, the improvement which comprises the steps of:
   previously providing a dummy passage in the closing unit and a pressure sensor in said dummy passage; and
   confirming the closing of the passage on the basis of closing of the dummy passage detected by said pressure sensor.

4. A closing unit of a fluid passage, comprising:
   cooling/heating means for cooling and heating said fluid passage, arranged in the vicinity of the fluid passage; and
   control means for controlling the cooling/heating means to freeze or thaw the fluid, and in which fluid in the passage is frozen by being cooled to close the passage, and the frozen fluid is thawed by being heated to open the passage,
   wherein said control means includes a temperature controller for controlling the cooling/heating means to cool the fluid to a temperature below a freezing point of the fluid in closing of the passage and to elevate the temperature of the frozen fluid to a temperature close to the freezing point after the fluid is frozen, and wherein said temperature is kept close to the freezing point to maintain a closing of the passage.

5. In a control method of opening and closing a fluid passage, in which a fluid in the passage is frozen to close the passage and the frozen fluid is thawed to open the passage, the improvement which comprises the steps of:
   in the closing of the passage, freezing the fluid by cooling below the freezing point of the fluid; and after closing the passage, the fluid temperature is stepwisedly elevated to a temperature close to the freezing point thereof.

6. A control method for a closing unit which comprises means for cooling and heating fluid, means for transmitting heat, joined to said cooling and heating means, a fluid passage joined to or embedded to said heating transmitting means and means for controlling the cooling and heating of said cooling and heating means, wherein said fluid passage is closed and opened by freezing and thawing fluid in said fluid passage, respectively, said control method comprising the steps of:

cooling said heat transmitting means by said cooling and heating means to freeze the fluid in said fluid passage and, when keeping a closed condition after said fluid passage functions to close itself, by the freezing of said fluid, elevating and maintaining the temperature of the frozen fluid in said fluid passage to a temperature close to the freezing point of said fluid.

7. A control method for a closing unit which comprises a thermoelectric element for cooling and heating fluid by electric power, means for transmitting heat, joined to said thermoelectric element, a fluid passage joined to or embedded to said heat transmitting means and means for controlling said thermoelectric element, wherein said fluid passage is closed and opened by freezing and thawing the fluid in said fluid passage, respectively, said control method comprising the steps of:

cooling said heat transmitting means by said thermoelectric element to freeze said fluid in said fluid passage and, when keeping a closed condition after said fluid passage functions to close itself, by the freezing of said fluid, controlling said thermoelectric element so as to elevate and maintain the temperature of the frozen fluid in said fluid passage to a temperature close to the freezing point of said fluid.

8. A control method for a closing unit which comprises a thermoelectric element for cooling and heating fluid by electric power, means for transmitting heat, joined to said thermoelectric element, a fluid passage joined to or embedded to said heat transmitting means and means for controlling said thermoelectric element, wherein said fluid passage is closed and opened by freezing and thawing the fluid in said fluid passage, respectively, said control method comprising:

when keeping a condition in which said passage is closed by freezing of said fluid, lowering the level of an electric power supply applied to said thermoelectric element to an amount which is less than that needed for effecting a closing of said passage so that the temperature of the frozen fluid is elevated to a temperature close to the freezing point of said fluid.

9. A control method for a closing unit which comprises a thermoelectric element for cooling and heating a fluid by electric power, means for transmitting heat, joined to said thermoelectric element, a fluid passage provided in said heat transmitting means and means for controlling said thermoelectric element, wherein said fluid passage is closed and opened by freezing and thawing the fluid in said fluid passage, respectively, said control method comprising the steps of:

cooling said fluid in said fluid passage to temperature below the freezing point of said fluid to close said fluid passage; and after said fluid passage is closed, elevating the temperature of the frozen fluid to a temperature close to the freezing point of said fluid.

10. A control method as claimed in claim 9, wherein the temperature of said fluid is elevated immediately after the passage is closed.

11. A control method as claimed in claim 9, wherein said fluid is stepwisedly elevated in temperature.

* * * * *